April 15, 1930. W. HURLBURT 1,754,893
TORQUE CONVERTER
Filed March 12, 1928 2 Sheets-Sheet 2
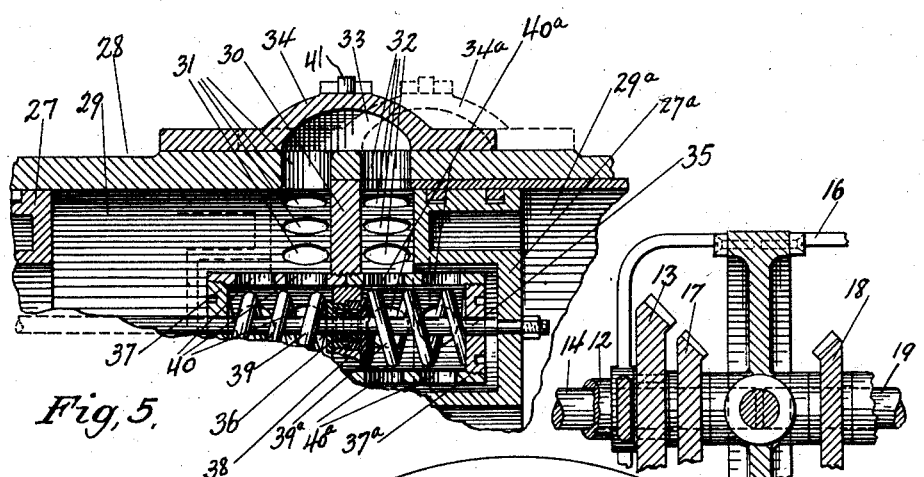
Fig. 5.
Fig. 4.
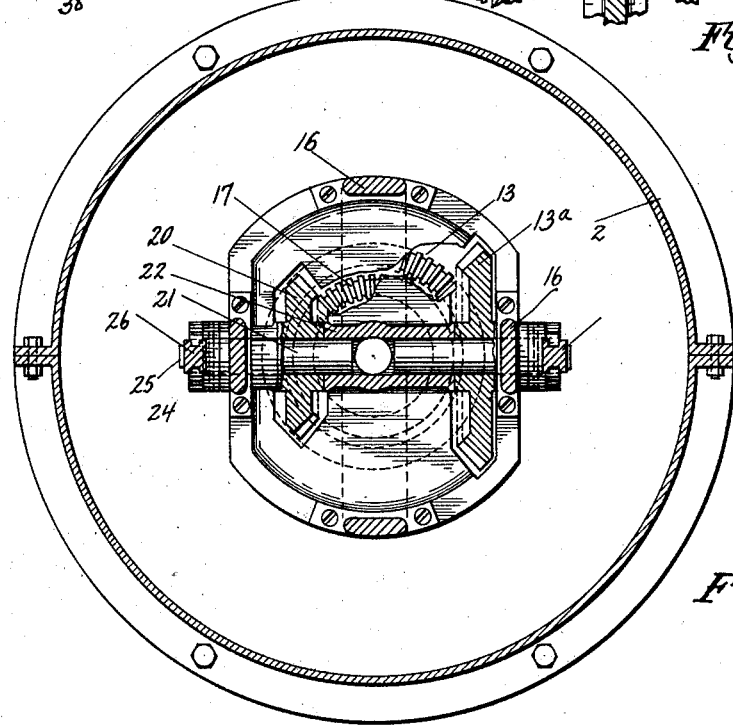
Fig. 3.
Inventor:
Watson Hurlburt Patented Apr. 15, 1930

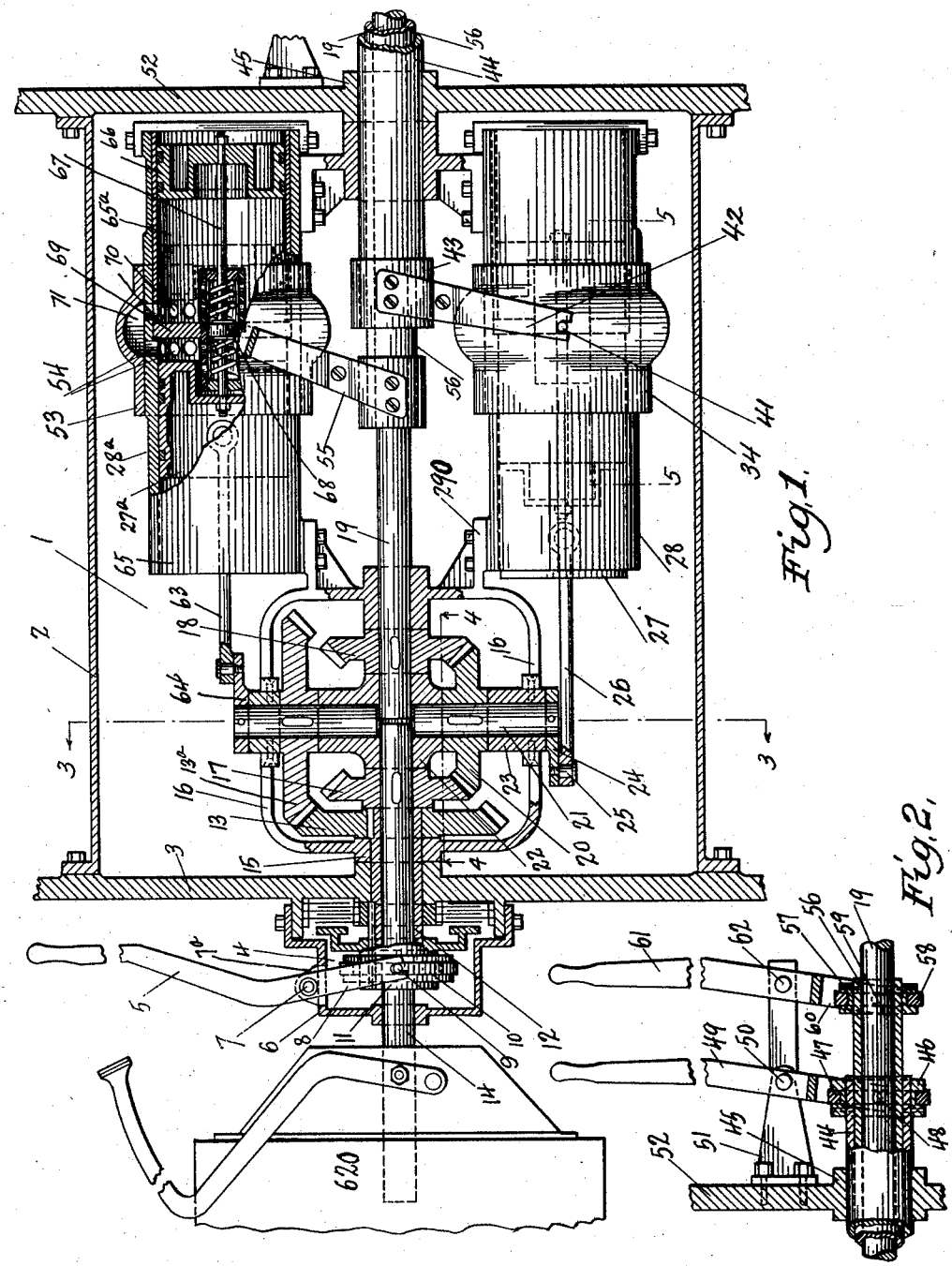

1,754,893

UNITED STATES PATENT OFFICE

WATSON HURLBURT, OF CHICAGO, ILLINOIS

TORQUE CONVERTER

Application filed March 12, 1928. Serial No. 261,033.

My invention relates to a mechanism designed to control and vary at will the speed of a driven gear when the first gear, or driver, has a more or less constant rate of revolution, without gear shifts, the gears being in constant mesh.

The principal objects of my invention are:—first, to go from no speed up to the maximum of the driving gear and any intermediate speed by simply throwing a lever in or out, the speed varying according to the travel of the lever. Second, no throwing in or out of gears, the gears being always in mesh. Third, to form a cushioned drive, by means of which longer life is obtained than through the medium of a regular gear set. Fourth, to obtain a quick pick-up, but at the same time a control that gradually applies the power instead of a set speed at the instant the change is made. Fifth, to provide a safety device whereby if by chance the full speed of the driving service is applied to the driven shaft, mechanism is provided that shall yield before the strain becomes great enough to rupture the important parts of the mechanism. Sixth, to provide a braking mechanism involving independent parts from the emergency and foot brakes.

To properly describe my invention I have illustrated one method of accomplishing the ends sought, but I do not wish to be limited to the exact details of construction herewith shown, as various deviations from those illustrated would not depart from the spirit of my invention.

The preferred construction as outlined in my invention is illustrated in the accompanying drawings in which:—

Fig. 1 is a vertical section with some members in elevation through the entire mechanism taken on the center line. A conventional form of automobile clutch assembly is indicated as outside the housing at the extreme left.

Fig. 2 shows the extension of the driven shaft at the rear of the last bearing in Fig. 1, outside of which are positioned the two hollow shafts by means of which the valves are operated by the two hand levers.

Fig. 3 is a section on line 3—3 of Fig. 1, some parts being in elevation.

Fig. 4 is a partial section and elevation on line 4—4 of Fig. 1.

Fig. 5 is an enlarged section on line 5—5 of Fig. 1 through cylinder showing the balanced valve parts, pistons, safety bypass and contiguous parts.

The illustrations show beveled gears throughout, but straight pinions may be used with the same results, with construction changed to suit.

Generally speaking, the mechanism consists of a planetary gear system, where the revolutions of the intermediate gear are subject to control at will of the operator, and in my illustrations an hydraulic control is portrayed, a crank arm, connecting rod, piston, cylinder and valve being the preferred means of such control.

The peculiar characteristics of the planetary gear system have become quite familiar to many, but I might review some of these that actually enter into the successful working of my present torque converter.

With two independent shafts in line with each other, bearing on their ends each a bevel gear keyed on, and brought into meshing relation to a third, or intermediate, bevel gear, one of the first named bevel gears I will term the "driver", and the second the "driven", all being provided with proper bearings. When the first, or driver gear, is set in motion, and the intermediate gear free to revolve on its axis, and also the entire system free to rotate about its center, the second, or driven, gear will receive the torque caused only by the friction of the intermediate small gear in its bearings and teeth which are in mesh. Considering the driven gear as having an initial load, no movement occurs. On the other hand, if the intermediate gear is locked, or prevented from revolving on its axis, the driven gear will take on the full speed of the driver, and in the same direction. Now by reducing the friction ever so little, the intermediate gear is allowed to revolve and a relative ratio of revolution is registered on the driven gear, causing it to lose speed. By increasing the slippage, caused by decreasing the friction on said intermediate gear, the driven gear again loses speed in a relative ratio. Thus by interposing means for increasing or decreasing the friction, any speed ratio may be obtained from full speed, a snail's pace, or no movement at all.

Coming now to the reverse drive, when the intermediate gear is free to revolve, but the system as a whole obstructed from rotating, or locked, a reverse movement of the driven gear takes place at the speed of the driver; by allowing a slippage to take place in the rotation of the system as a whole, the speed of the driven gear decreased in relative ratio to the slippage, or reduction, of friction.

To actually stop the driven gear, throw out clutch between the prime mover and driver, put friction on the intermediate gear and also against the rotation of the system as a whole, locking either one and applying the friction gradually to the other, and rotation of the driven shaft slows down in relative proportion to the friction applied.

In the drawings 1 indicates the whole assembly, 2 the casing, 3 a part of the forward bearing, 4 clutch assembly, 5 clutch lever, 6 clutch housing, 7 clutch pivot, 8 clutch fork, 9 pins on split ring, 10 split ring, 11 sleeve slidably attached to hollow shaft 12, on which is fixed the bevel gear 13, both 12 and 13 being loose on the drive shaft 14. Outside of 12 and running thereon is a hollow extension hub 15 of frame 16, forming one end support of the entire system 1 and rotatable on the hollow shaft 12; upon shaft 14 is mounted bevel gear 17 affixed by a key. The bevel gear 17 is the driving member of the planetary system, of which the bevel gear 18 is the driven, and keyed to shaft 19. The intermediate gear 20 meshes with gears 17 and 18, through which power is transmitted from the driver to the driven, both direct and reverse. Bevel gear 20 has keyed to it shaft 21, extending from the center bearings 22 outward through bearing 23, said 23 being an extension hub on the frame 16. On its outer end keyed to shaft 21 is the crank arm 24, bearing the pin 25, pivotally carrying the connecting rod 26, driving the piston 27 in the cylinder 28, carried by suitable brackets 290 on frame 16.

As we have heretofore stated, a control placed upon intermediate gear 20, exercises a control in a proportionate ratio upon driven gear 18. To exercise this control, I divide the cylinder 28 into a front chamber 29, see Fig. 5, and rear chamber $29^a$ being separated by the dividing wall 30, communication between which is obtained by means of circumferential openings or ports 31 in chamber 29 and circumferential openings or ports 32, in rear chamber $29^a$, the continuity of the flow of the medium through these openings being established by passage 33 in sliding valve sleeve 34. Dotted position of this sleeve, $34^a$, shows it covering ports 31, cutting off entirely communication between the front and rear chambers, and when thus disposed the pistons are locked from movement. Piston 27 in forward chamber has connected to it piston $27^a$ in rear chamber $29^a$ by the spacing rod 35, reciprocating through the plunger 38, and provided with a proper stuffing box 36; movements of 27 being necessarily followed by $27^a$, the medium being pulled and forced from one chamber to the other by means of these pistons. When the sleeve 34 slightly covers ports 31, friction to the flow of the medium is inserted and it is retarded in its movement, thus retarding the movement of pistons 27 and $27^a$, said pistons being connected to intermediate gear 20 by means of connecting rod 26, and said gear 20 is retarded. When increased obstruction or friction is interposed, freedom of movement is further reduced and more retardation occurs.

Should sleeve 34 be suddenly moved to cover ports 30 without allowing time for the inertia of the load on driven shaft 19 to be properly overcome, a heavy strain occurs in the different members. To relieve this strain I provide cylinders 37, $37^a$, and an intermediate plunger 38 held in a median position by springs 39, $39^a$, the size and tension of which are enough, under the point of rupture of the operating members of the system, so that an acceptible factor of safety is thus interposed. Should valve 34 be moved too rapidly to cover the ports 30, and sufficient impetus is behind the piston 27 when moving to the right from the position shown in Fig. 5, the medium, being forced against the plunger 38 causes the compression of spring $39^a$. The medium passes from chamber $37^a$ through ports $40^a$ in the wall of cylinder $37^a$, and is allowed to pass from cylinder 29 through ports 40 in walls of cylinder 37. On the return of piston 27 a reverse action occurs, the spring 39 being compressed, and the medium is returned again to cylinder 29. The compressions of the springs and retardation of the flow of the medium all tend to act as a pick up of the load and as a safety device. To accomplish the movement of sleeve valve 34, I have fixed thereon the arm 42 rigidly fixed to pin 41, engaging the arm 42 rigidly fixed to sleeve 43, which in turn is fixed to hollow shaft 44, slidably mounted on hollow shaft 56 and revolving in bearing 45. See Figs. 1 and 2. At the extreme end of 44 I rigidly mount the sleeve 46; revolvably mounted thereon is the split ring 47, having thereon the pins 48 engaging the lower end of lever 49 and fulcrumed at 50 on bracket 51, mounted on support 52, this in turn being fixed to supports not shown. It is quite obvious that operating the lever 49 to the left produces a reverse movement of sleeve 34, and one is enabled to operate said sleeve at will, whether the system is in rotation or at rest.

I now turn to the means and methods producing a revolution of driven gear 18 in a reverse direction.

The non-revolvable member 3 supports a common form of clutch 4 in the housing 6, the operation of this clutch being by means of lever 5 fulcrumed at 7, supported by bracket 7ª, attached to housing 6. The fork 8 of lever 5 engages pins 9 on split sleeve 10, lying in the annular slot in sleeve 11, splined to hollow shaft 12. Upon throwing clutch 4 into contact relation, gear 13 is locked from revolving, and bevel gear 13ª in mesh takes on torque corresponding to the freedom allowed the system as a unit to revolve about its center. Should no friction be interposed in the free movement of the piston 27ª, bevel gear 13ª will simply revolve with the speed of the planetary system. Now with gear 20 perfectly free to revolve, this means sleeve valve 34 is in position shown in Fig. 5. I latterly move sleeve 53, gradually closing openings 54; this interposes an obstacle in the free circulation of the medium in forward chamber of cylinder 28ª, and through this medium the piston 27ª is caused to lag, reducing the revolutions of gear 13ª and through this retardation the rotations of the planetary system, with the result that a reverse action is set up in driven gear 18. Increasing the lag, by increasing the friction to the free circulation of the medium, increases the reverse torque. When the circulation of the medium is wholly obstructed by moving sleeve valve 53 latterly, completely closing the openings 54, the piston is held against movement and gear 13ª is locked, resulting in full speed in reverse. Lateral movement of the sleeve valve 53 is effected through the medium of the trunnion pins, not shown, which engage the arms of the forked lever 55, this being rigidly fastened to a hollow shaft 56, splined on shaft 19, carrying on its rear end and outside of the bearing 45, a fixed collar, having an annular channel 57, split ring 58, studs 59 in split ring, an engaging fork 60 at the lower end of a lever 61, fulcrumed at 62.

To use as a brake, I first throw out the clutch 620 from the primary power to the drive shaft 14, cover openings 30 by means of lever 49, hollow shaft 44, arm and fork 42, locking bevel gear 20 in mesh with gear 18,— throw in clutch 4 by means of lever 5, locking gear 13, gradually slide cap 53 to cover ports 54 by means of lever 61.

I have described in detail the action and results taking place in cylinder 28, enlarged details of which are shown in Fig. 5; the construction and operation of parts in cylinder 28ª which control the movements of gear 13ª, causing a reverse revolution in gear 18, is identical to those in cylinder 27, so that our exposition of the direct action simply would be repeated for the reverse; the extreme inward travel of piston 27ª is shown in Fig. 1, transference of control being made through connecting rod 63 to crank arm 64 to gear 13ª. The cylinder 28ª is similarly divided by wall 69 into front chamber 65 and rear chamber 65ª, the pistons 27ª and 66 working in their respective chambers, and connected together by rod 67, reciprocating through the plunger 68, leakage being prevented by a stuffing box, not shown, circumferential ports 54 in chamber 65, and circumferential ports 70 in rear chamber 65ª, together with passage 71 in sleeve 53, provide communication between chambers 65 and 65ª.

I claim:—

1. In a transmission device, a driving shaft, a driven shaft, a bevel gear fixed to the inner end of each of said shafts, an intermediate gear rotatable about said shafts and about its own axis, said intermediate gear engaging said first-named gears, and means for variably resisting the rotation of said intermediate gear for controlling the relative rotation of said driving and driven gears, said means comprising a cylinder, a partition in said cylinder, a piston at each side of said partition for confining a fluid within said cylinder at each side of said partition, a by-pass for connecting the portions of each piston at each side of said partition, means for varying the size of said by-pass, and yielding means for providing an additional by-pass between the portions of said cylinder at each side of said partition when the pressure in said cylinder exceeds a predetermined amount.

2. In a transmission mechanism, a driving shaft, a driven shaft, planetary gear mechanism between the inner ends of said shafts, means for variably resisting the relative movement of the planetary gear with the rest of said mechanism, a gear rotatable about one of said shafts, a gear rotatably mounted on and carried by said mechanism for meshing with said first-named gear, and means for variably resisting the rotation of each of said gears for causing the driven shaft to rotate oppositely to that of the driving shaft.

3. A braking device for resisting the relative movement of the gears of a differential mechanism, comprising a cylinder, a pair of pistons reciprocating within said cylinder, a partition between said pistons for dividing said cylinder into two compartments, a fluid in said compartments between said pistons, means for transferring said fluid from one of said compartments to the other upon the reciprocation of said pistons, means for varying the rate of transfer of said fluid, means comprising a double-acting valve carried by the partition for by-passing said fluid from one compartment to the other when the pressure therein exceeds a predetermined maximum, and means for yieldably holding said valve in its normally closed position.

4. In transmission mechanism, a driving shaft, a driven shaft, a frame rotatably mounted on the inner ends of said shafts, differential gear mechanism carried by said frame between said shafts, a reverse gear, a cooperating gear rotatably mounted on said frame for engaging said reverse gear, means for controlling the operation of said reverse gear, means for controlling the rotation of said cooperating gear comprising a cylinder, a piston in said cylinder adapted to be reciprocated by said cooperating gear, and manually operated means for controlling the operation of said piston.

5. In a transmission device, a driving shaft, a driven shaft, a frame rotatably mounted on the ends of said shafts, a gear on the inner end of each shaft, an intermediate gear rotatably mounted on said frame and meshing with said gears, a reverse gear rotatably mounted relative to said frame and said drive shaft, a gear rotatably mounted on said frame and meshing with said last-named gear, means for variably resisting the rotation of the gear on said frame, and means for controlling the rotation of said control gear.

6. In a transmission device, a driving shaft, a reverse gear revolvably mounted on the driving shaft, means controlling the rotation of said gear, a driven shaft in coaxial alignment, gear mechanism between the inner ends of said shafts including a planetary gear arrangement, said arrangement comprising a central hub in which are journalled the inner ends of said shafts and the inner ends of two other shafts at right angles thereto, said last named shafts each carrying a planetary gear, one of which controls the transmission of power between the driving shaft and the driven shaft, the other of which controls the planetary movement of the system, and means for variably resisting the rotation of said planetary gears for exercising said control.

7. In a transmission device, a driving shaft, a driving gear keyed thereto, a driven shaft, a driven gear keyed thereto, an intermediate gear in mesh with the driving and driven gears, a reverse gear revolvably mounted on the driving shaft, means for controlling the rotation of said gear, a planetary gear in mesh with the reverse gear, means including a cylinder and piston operatively connected to the intermediate gear to resist its relative rotation, means including a second cylinder and piston operatively connected to the reverse gear to resist its relative rotation, and means for controlling the resistance effected by the cylinders for setting up a braking action on the driven shaft.

8. In a transmission device, a driving shaft, a driven shaft in coaxial alinement, a reverse gear revolvably mounted on the driving shaft, means controlling the rotation of said gear, gear mechanism between the inner ends of said shafts including a planetary gear arrangement, said arrangement comprising a central hub in which are journaled the inner ends of said shafts and the inner ends of two other shafts at right angles thereto, said last named shafts each carrying a planetary gear, one of which controls the transmission of power between the driving shaft and the driven shaft, the other of which meshes with the reverse gear and controls the planetary movement of the system, means for variably resisting the rotation of said planetary gears for exercising said control, said means being adapted to be operated to retard rotation of the driven shaft.

WATSON HURLBURT.